US011542744B2

(12) United States Patent
Nakayama et al.

(10) Patent No.: US 11,542,744 B2
(45) Date of Patent: Jan. 3, 2023

(54) AGENT DEVICE, AGENT DEVICE CONTROL METHOD, AND STORAGE MEDIUM

(71) Applicant: HONDA MOTOR CO., LTD., Tokyo (JP)

(72) Inventors: Hiroki Nakayama, Wako (JP); Yoshifumi Wagatsuma, Wako (JP); Kengo Naiki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 16/823,369

(22) Filed: Mar. 19, 2020

(65) Prior Publication Data
US 2020/0308895 A1 Oct. 1, 2020

(30) Foreign Application Priority Data

Mar. 25, 2019 (JP) .............................. JP2019-056594

(51) Int. Cl.
*G10L 15/22* (2006.01)
*E05F 15/73* (2015.01)
*B60R 16/037* (2006.01)
*G10L 13/00* (2006.01)

(52) U.S. Cl.
CPC .......... *E05F 15/73* (2015.01); *B60R 16/0373* (2013.01); *G10L 13/00* (2013.01); *G10L 15/22* (2013.01); *E05Y 2400/45* (2013.01); *E05Y 2400/85* (2013.01); *E05Y 2900/55* (2013.01); *G10L 2015/223* (2013.01)

(58) Field of Classification Search
USPC .......................... 704/246, 247, 251, 252, 275
See application file for complete search history.

(56) References Cited

U.S. PATENT DOCUMENTS

| 2008/0120175 A1* | 5/2008 | Doering ................. G06Q 30/02 701/123 |
| 2010/0088093 A1* | 4/2010 | Lee .......................... G10L 15/20 704/E15.045 |
| 2016/0176372 A1* | 6/2016 | Kim ......................... E05F 15/73 701/49 |
| 2020/0079310 A1* | 3/2020 | Kline .................. G01C 21/3461 |
| 2022/0013099 A1* | 1/2022 | Lee ..................... B60W 40/105 |

FOREIGN PATENT DOCUMENTS

| JP | 2000-181500 | 6/2000 |
| JP | 2005-096646 | 4/2005 |
| JP | 2006-335231 | 12/2006 |
| WO | 2017/203688 | 11/2017 |

OTHER PUBLICATIONS

Japanese Office Action for Japanese Patent Application No. 2019-056594 dated Oct. 25, 2022.

* cited by examiner

*Primary Examiner* — Leonard Saint-Cyr
(74) *Attorney, Agent, or Firm* — Amin, Turocy & Watson, LLP

(57) ABSTRACT

An agent device includes an agent functional controller configured to provide a service including causing an output device to output a response of voice in response to an utterance of an occupant of a vehicle, and a controller configured to permit an operation of a power window of the vehicle when a speed of the vehicle is less than a first threshold value and limit the operation of the power window of the vehicle when the speed of the vehicle is equal to or greater than the first threshold value when the agent functional controller is activated.

12 Claims, 14 Drawing Sheets

FIG. 7
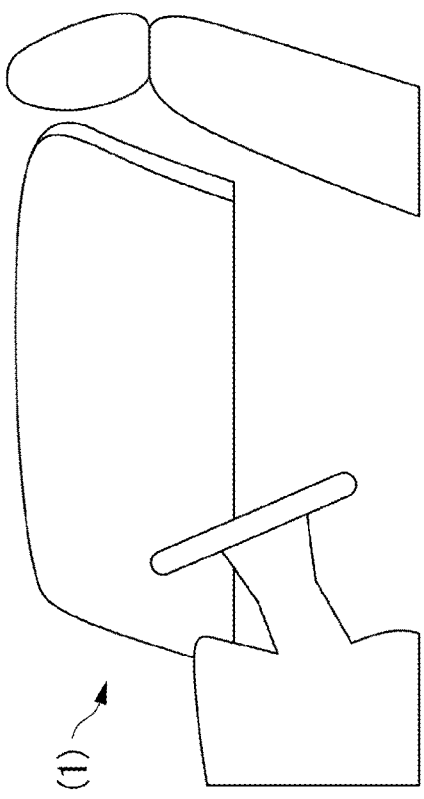
(1)
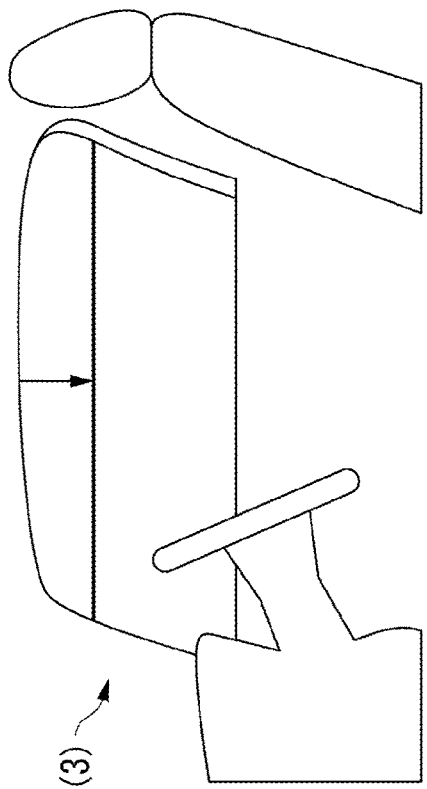
(3)
VEHICLE SPEED IS LESS THAN THRESHOLD VALUE
VEHICLE SPEED IS EQUAL TO OR GREATER THAN THRESHOLD VALUE
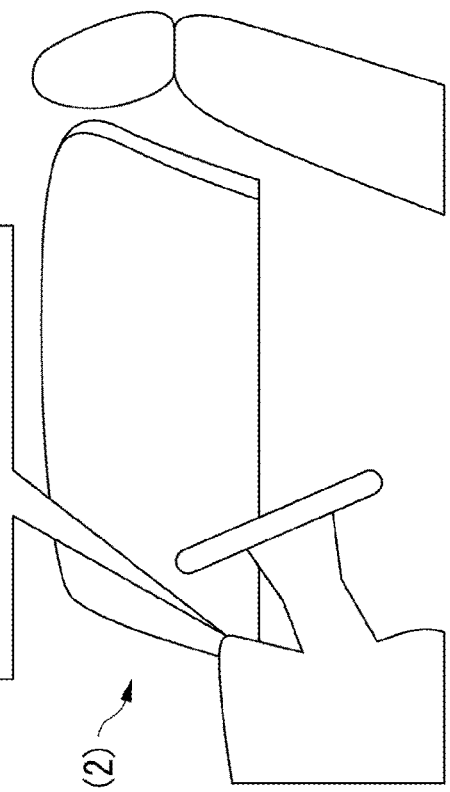
(2)
WINDOW WILL BE MAINTAINED IN THIS STATE BECAUSE SERVICE PROVISION OF THE AGENT MAY BE AFFECTED

AGENT DEVICE, AGENT DEVICE CONTROL METHOD, AND STORAGE MEDIUM

CROSS-REFERENCE TO RELATED APPLICATION

Priority is claimed on Japanese Patent Application No. 2019-056594, filed Mar. 25, 2019, the content of which is incorporated herein by reference.

FIELD

The present invention relates to an agent device, an agent device control method, and a storage medium.

DESCRIPTION OF RELATED ART

A conventional technology related to an agent function of providing information about driving assistance, vehicle control, other applications, and the like at the request of an occupant of a vehicle while conversing with the occupant has been disclosed (Japanese Unexamined Patent Application, First Publication No. 2006-335231).

Although a technology of mounting agent functions in a vehicle has been put to practical use in recent years, provision of services in agent functions and vehicle control have not been sufficiently studied. Accordingly, there are cases in which vehicle control affects provision of services in the conventional technology.

SUMMARY

An object of the present invention devised in view of such circumstances is to provide an agent device, an agent device control method, and a storage medium which can provide more faithful services to users.

An agent device, an agent device control method, and a storage medium according to the present invention employ the following configurations.

(1): An agent device according to an aspect of the present invention is an agent device including: an agent functional controller configured to provide a service including causing an output device to output a response of voice in response to an utterance of an occupant of a vehicle; and a controller configured to permit an operation of a power window of the vehicle when a speed of the vehicle is less than a first threshold value and limit the operation of the power window of the vehicle when the speed of the vehicle is equal to or greater than the first threshold value when the agent functional controller is activated.

(2): In the aspect of (1), when the speed of the vehicle is less than the first threshold value and the occupant makes an utterance including an instruction for the operation of the power window, the controller is configured to operate the power window according to the instruction.

(3): In the aspect of (1) or (2), when the speed of the vehicle is equal to or greater than the first threshold value and the occupant makes an utterance including an instruction for the operation of the power window, the controller is configured to not operate the power window according to the instruction.

(4): In any one of aspects of (1) to (3), the instruction for operation of the power window is an instruction for causing a window of the power window to be opened or an instruction for causing the window to be close to a fully open state.

(5): In any one of aspects of (1) to (4), the instruction for the operation of the power window is an instruction according to an utterance or an instruction according to an operation of an operating switch.

(6): In any one of aspects of (1) to (5), when the speed of the vehicle is equal to or greater than the first threshold value and the occupant makes an utterance including an instruction for causing the power window to be opened or an instruction for causing the power window to be close to the fully open state, the controller is configured to operate the power window according to the instruction such that a recognition level at which a voice recognizer which is configured to recognize details of utterances of the occupant of the vehicle recognizes the utterance does not become less than a predetermined value.

(7): In any one of aspects of (1) to (6), when the occupant makes an utterance including an instruction for causing a window of the power window to be closed or an instruction for causing the window to be close to a fully closed state in a state in which the window of the power window is open and the speed of the vehicle is equal to or greater than the first threshold value, the controller is configured to operate the power window according to the instruction without limiting the operation of the power window.

(8): In any one of aspects of (1) to (7), when the recognition level at which the voice recognizer which is configured to recognize details of utterances of the occupant of the vehicle recognizes the utterance is less than the predetermined value in a state in which a window of the power window is open and the speed of the vehicle is equal to or greater than the first threshold value, the controller is configured to control the power window to be closed such that the recognition level becomes equal to or greater than the predetermined value.

(9): In any one of aspects of (1) to (8), the agent device further includes a provider configured to provide information for inducing the occupant to close a window of the power window or cause the window to be close to a closed state when the occupant makes an utterance in a state in which the window of the power window is open and the speed of the vehicle is equal to or greater than a second threshold value.

(10): In any one of aspects of (1) to (9), a vehicle speed less than the first threshold value is zero or a vehicle speed at which the vehicle travels slowly.

(11): In any one of aspects of (1) to (10), the controller is configured to not limit the operation of the power window of the vehicle in a state in which the specific functional agent controller is not activated and an agent functional controller different from the specific agent functional controller is activated.

(12): A vehicle control method according to an aspect of the present invention is an agent device control method, by a computer, including: causing an agent functional controller configured to provide a service including causing an output device to output a response of voice in response to an utterance of an occupant of a vehicle to provide the service; and permitting an operation of a power window of the vehicle when a speed of the vehicle is less than a first threshold value and limiting the operation of the power window of the vehicle when the speed of the vehicle is equal to or greater than the first threshold value when the agent functional controller is activated.

(13): A storage medium according to an aspect of the present invention is a storage medium storing a program causing a computer to: cause an agent functional controller configured to provide a service including causing an output device to output a response of voice in response to an utterance of an occupant of a vehicle to provide the service; and permit an operation of a power window of the vehicle when a speed of the vehicle is less than a first threshold value and limit the operation of the power window of the vehicle when the speed of the vehicle is equal to or greater than the first threshold value when the agent functional controller is activated.

According to (1) to (5), (7), (10) to (13), it is possible to provide more faithful services to a user because the operation of a power window is permitted or limited in response to a vehicle speed.

According to (6), the controller is configured to operate the power window according to an instruction such that a recognition level at which an utterance is recognized does not become less than a predetermined value, and thus it is possible to provide more faithful services to a user while realizing a demand of the user.

According to (8), the controller is configured to control the power window to be in a closed state such that the recognition level becomes equal to or greater than the predetermined value, and thus it is possible to provide more faithful services to a user more definitely.

According to (9), the provider provides information for inducing an occupant to cause a window to be in a closed state or to be close to the closed state, and thus it is possible to induce the user to operate the windows.

BRIEF DESCRIPTION OF THE DRAWINGS

FIG. 7 is a diagram showing an example of a state in which a window is controlled according to an instruction of an occupant.

DETAILED DESCRIPTION

Hereinafter, embodiments of an agent device, an agent device control method, and a storage medium of the present invention will be described with reference to the drawings.

First Embodiment

An agent device is a device for realizing a part or all of an agent system. As an example of the agent device, an agent device which is mounted in a vehicle (hereinafter, a vehicle M) and includes a plurality of types of agent functions will be described below. An agent function is, for example, a function of providing various types of information based on a request (command) included in an utterance of an occupant of the vehicle M or mediating network services while conversing with the occupant. Agent functions may include a function of performing control of a device in a vehicle (e.g., a device with respect to driving control or vehicle body control), and the like.

An agent function is realized, for example, using a natural language processing function (a function of understanding the structure and meaning of text), a conversation management function, a network search function of searching for other devices through a network or searching for a predetermined database of a host device, and the like in addition to a voice recognition function of recognizing voice of an occupant (a function of converting voice into text) in an integrated manner Some or all of such functions may be realized by artificial intelligence (AI) technology. A part of a configuration for executing these functions (particularly, the voice recognition function and the natural language processing and interpretation function) may be mounted in an agent server (external device) which can communicate with an on-board communication device of the vehicle M or a general-purpose communication device included in the vehicle M. The following description is based on the assumption that a part of the configuration is mounted in the agent server and the agent device and the agent server realize an agent system in cooperation. A service providing entity (service entity) caused to virtually appear by the agent device and the agent serve in cooperation is referred to as an agent.

<Overall Configuration>

Figure 1:
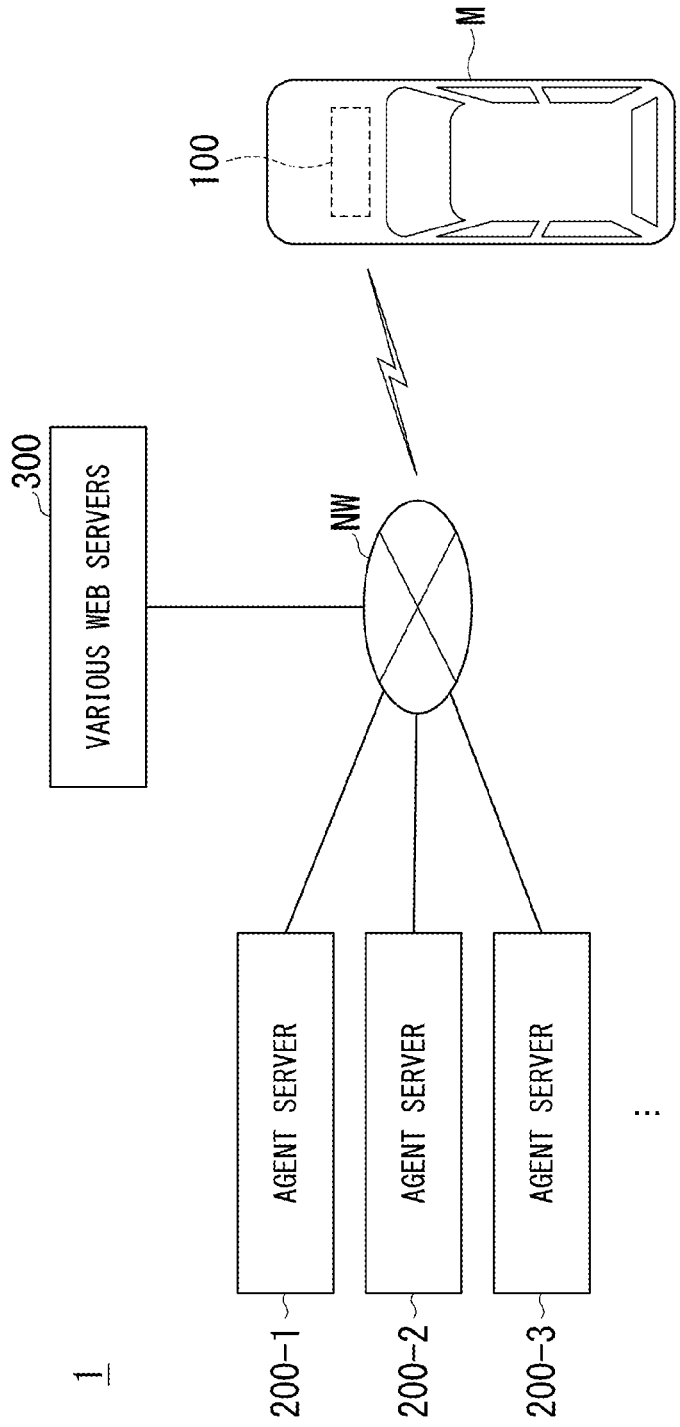
FIG. 1 is a configuration diagram of an agent system including an agent device.

FIG. 1 is a configuration diagram of an agent system 1 including an agent device 100. The agent system 1 includes, for example, the agent device 100 and a plurality of agent servers 200-1, 200-2, 200-3, . . . . Numerals following the hyphens at the ends of reference numerals are identifiers for distinguishing agents. When agent servers are not distinguished, the agent servers may be simply referred to as an agent server 200. Although three agent servers 200 are shown in FIG. 1, the number of agent servers 200 may be two, four or more. The agent servers 200 are managed by different agent system providers. Accordingly, agents in the present embodiment are agents realized by different providers. For example, automobile manufacturers, network service providers, electronic commerce subscribers, cellular phone vendors and manufacturers, and the like may be conceived as providers, and any entity (a corporation, an organization, an individual, or the like) may become an agent system provider.

The agent device 100 communicates with the agent server 200 via a network NW. The network NW includes, for example, some or all of the Internet, a cellular network, a Wi-Fi network, a wide area network (WAN), a local area network (LAN), a public line, a telephone line, a wireless base station, and the like. Various web servers 300 are connected to the network NW, and the agent server 200 or the agent device 100 can acquire web pages from the various web servers 300 via the network NW.

The agent device 100 makes a conversation with an occupant of the vehicle M, transmits voice from the occupant to the agent server 200 and presents a response acquired from the agent server 200 to the occupant in the form of voice output or image display.

[Vehicle]

Figure 2:
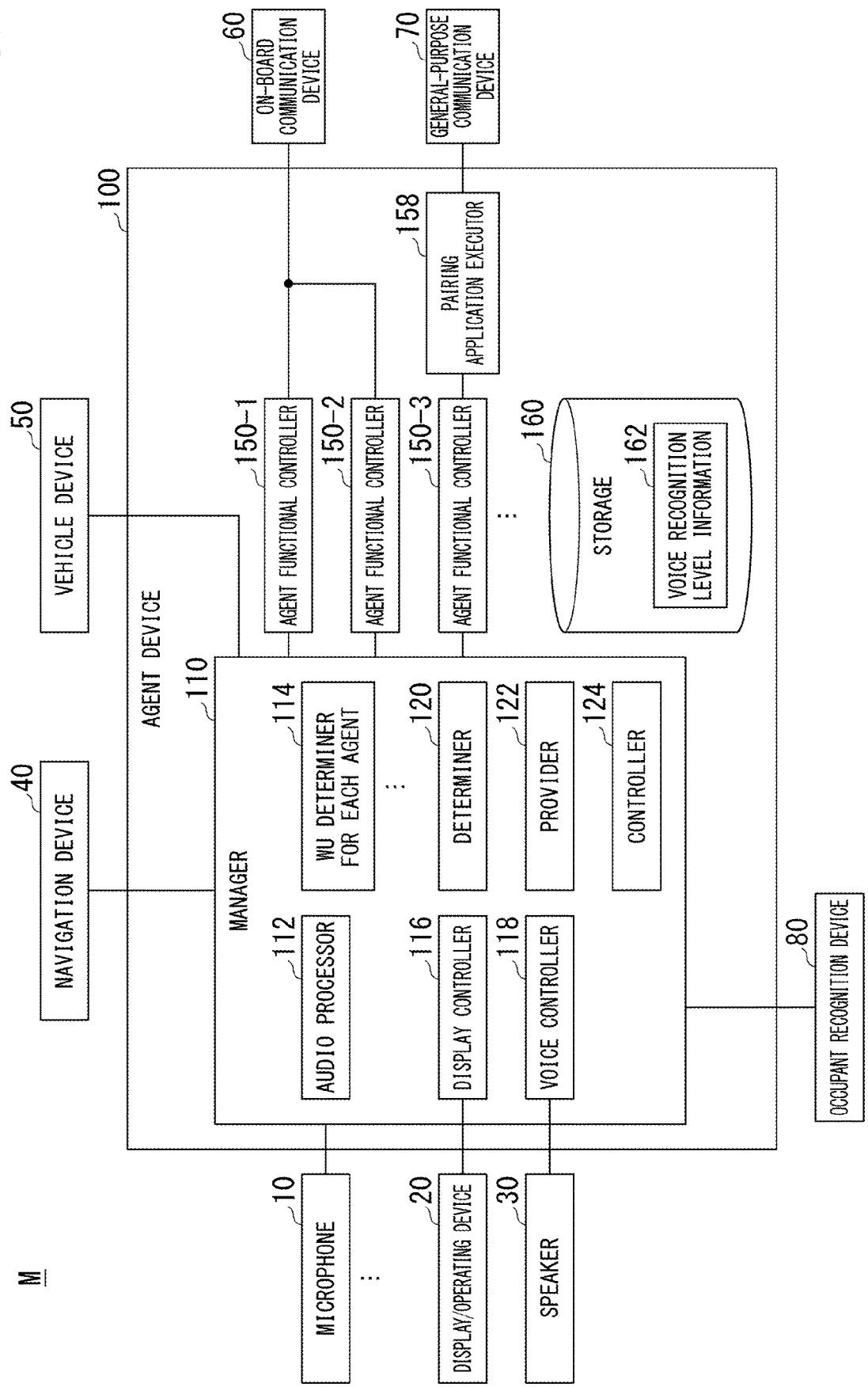
FIG. 2 is a diagram showing a configuration of an agent device according to a first embodiment and devices mounted in a vehicle.

FIG. 2 is a diagram showing a configuration of the agent device 100 according to the first embodiment and devices mounted in the vehicle M. For example, one or more microphones 10, a display/operating device 20, a speaker 30, a navigation device 40, a vehicle device 50, an on-board communication device 60, an occupant recognition device 80, and the agent device 100 are mounted in the vehicle M. There are cases in which a general-purpose communication device 70 such as a smartphone is included in a vehicle cabin and used as a communication device. Such devices are connected to each other through a multiplex communication line such as a controller area network (CAN) communication line, a serial communication line, a wireless communication network, or the like. The components shown in FIG. 2 are merely an example and some of the components may be omitted or other components may be further added.

The microphone 10 is an audio collector for collecting voice generated in the vehicle cabin. The display/operating device 20 is a device (or a group of devices) which can display images and receive an input operation. The display/operating device 20 includes, for example, a display device configured as a touch panel. Further, the display/operating device 20 may include a head up display (HUD) or a mechanical input device. The speaker 30 includes, for example, a plurality of speakers (sound outputs) provided at different positions in the vehicle cabin. The display/operating device 20 may be shared by the agent device 100 and the navigation device 40. This will be described in detail later.

The navigation device 40 includes a positioning device such as a navigation human machine interface (HMI) or a global positioning system (GPS), a storage device which stores map information, and a control device (navigation controller) which performs route search and the like. Some or all of the microphone 10, the display/operating device 20, and the speaker 30 may be used as a navigation HMI. The navigation device 40 searches for a route (navigation route) for moving to a destination input by an occupant from a position of the vehicle M identified by the positioning device and outputs guide information using the navigation HMI such that the vehicle M can travel along the route.

The route search function may be included in a navigation server accessible through the network NW. In this case, the navigation device 40 acquires a route from the navigation server and outputs guide information. The agent device 100 may be constructed on the basis of the navigation controller. In this case, the navigation controller and the agent device 100 are integrated in hardware.

The vehicle device 50 includes, for example, a driving power output device such as an engine and a motor for traveling, an engine starting motor, a door lock device, a door opening/closing device, an air-conditioning device, a power window, a vehicle speed sensor, and the like.

The on-board communication device 60 is, for example, a wireless communication device which can access the network NW using a cellular network or a Wi-Fi network.

The occupant recognition device 80 includes, for example, a seating sensor, an in-vehicle camera, an image recognition device, and the like. The seating sensor includes a pressure sensor provided under a seat, a tension sensor attached to a seat belt, and the like. The in-vehicle camera is a charge coupled device (CCD) camera or a complementary metal oxide semiconductor (CMOS) camera provided in a vehicle cabin. The image recognition device analyzes an image of the in-vehicle camera and recognizes presence or absence, a face orientation, and the like of an occupant for each seat. In the present embodiment, the occupant recognition device 80 is an example of a seating position recognizer.

Figure 3:
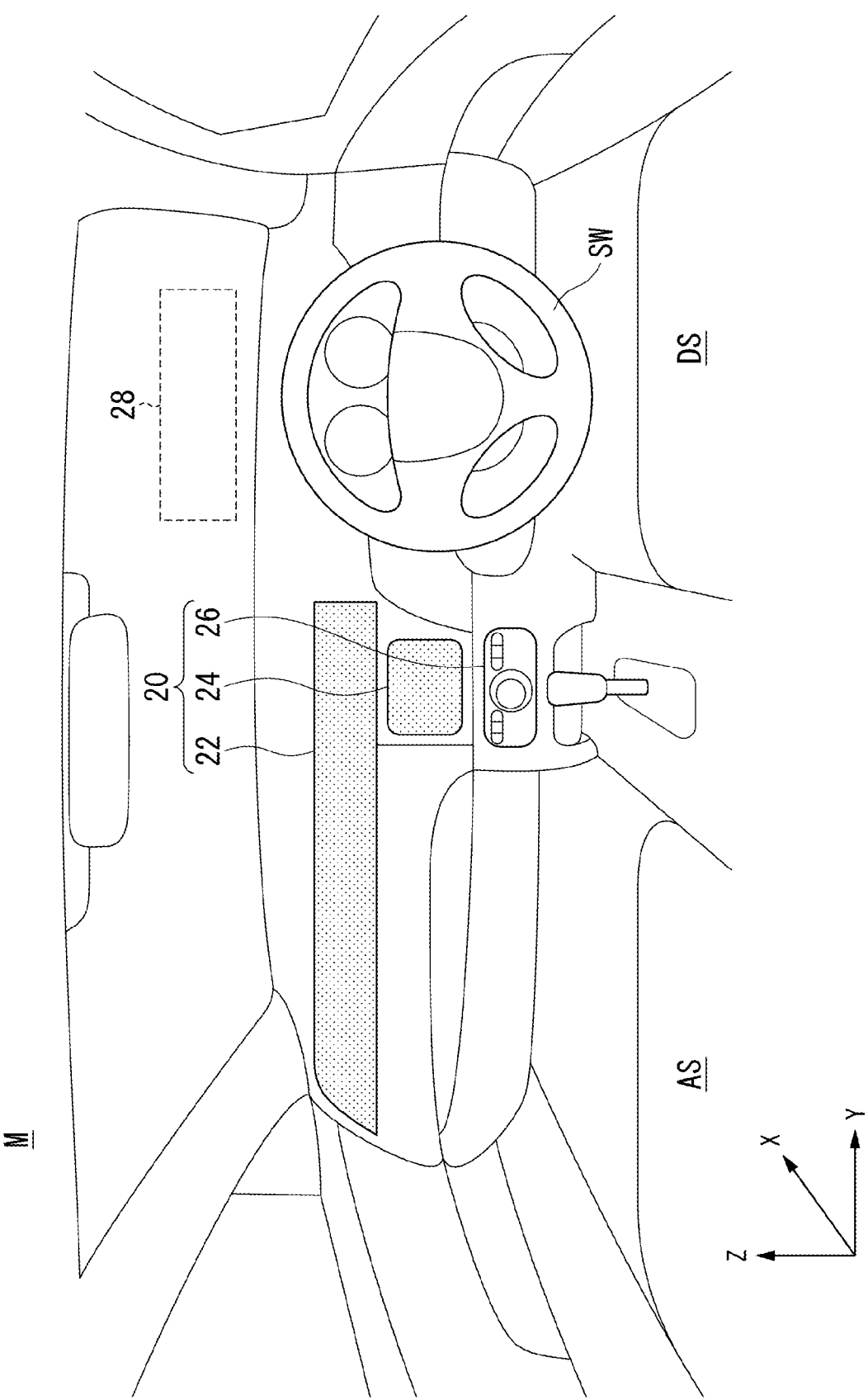
FIG. 3 is a diagram showing an arrangement example of a display/operating device.

FIG. 3 is a diagram showing an arrangement example of the display/operating device 20. The display/operating device 20 may include a first display 22, a second display 24, and an operating switch ASSY 26, for example. The display/operating device 20 may further include an HUD 28.

The vehicle M includes, for example, a driver's seat DS in which a steering wheel SW is provided, and a passenger seat AS provided in a vehicle width direction (Y direction in the figure) with respect to the driver's seat DS. The first display 22 is a laterally elongated display device extending from the vicinity of the middle region of the instrument panel between the driver's seat DS and the passenger seat AS to a position facing the left end of the passenger seat AS.

The second display 24 is provided in the vicinity of the middle region between the driver's seat DS and the passenger seat AS in the vehicle width direction under the first display 22. For example, both the first display 22 and the second display 24 are configured as touch panels and include a liquid crystal display (LCD), an organic electroluminescence (organic EL) display, a plasma display, or the like as a display. The operating switch ASSY 26 is an assembly of dial switches, button type switches, and the like. The display/operating device 20 outputs details of an operation performed by an occupant to the agent device 100. Details displayed by the first display 22 or the second display 24 may be determined by the agent device 100.

Figure 4:
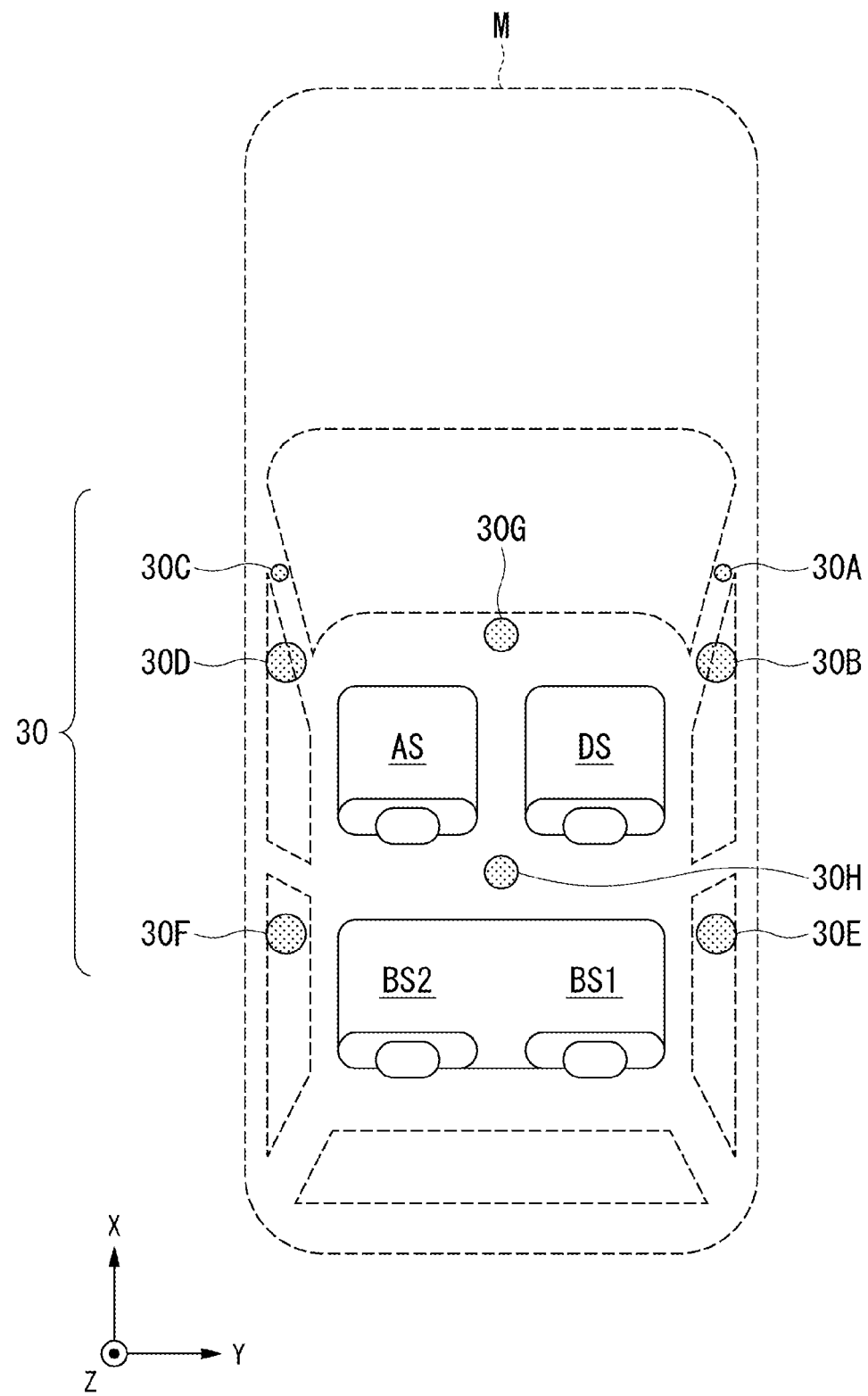
FIG. 4 is a diagram showing an arrangement example of a speaker.

FIG. 4 is a diagram showing an arrangement example of the speaker 30. The speaker 30 includes, for example, speakers 30A to 30H. The speaker 30A is provided on a window pillar (so-called A pillar) on the side of the driver's seat DS. The speaker 30B is provided on the lower part of the door near the driver's seat DS. The speaker 30C is provided on a window pillar on the side of the passenger seat AS. The speaker 30D is provided on the lower part of the door near the passenger seat AS. The speaker 30E is provided on the lower part of the door near the right rear seat BS1. The speaker 30F is provided on the lower part of the door near the left rear seat BS2. The speaker 30G is provided in the vicinity of the second display 24. The speaker 30H is provided on the ceiling (roof) of the vehicle cabin.

In such an arrangement, a sound image is located near the driver's seat DS, for example, when only the speakers 30A and 30B are caused to output sound. When only the speakers 30C and 30D are caused to output sound, a sound image is located near the passenger seat AS. When only the speaker 30E is caused to output sound, a sound image is located near the right rear seat BS1. When only the speaker 30F is caused to output sound, a sound image is located near the left rear seat BS2. When only the speaker 30G is caused to output sound, a sound image is located near the front part of the vehicle cabin. When only the speaker 30H is caused to output sound, a sound image is located near the upper part of the vehicle cabin. The present invention is not limited thereto and the speaker 30 can locate a sound image at any position in the vehicle cabin by controlling distribution of sound output from each speaker using a mixer and an amplifier.

[Agent Device]

Referring back to FIG. 2, the agent device 100 includes a manager 110, agent functional controllers 150-1, 150-2 and 150-3, a pairing application executer 158, and a storage 160. The manager 110 includes, for example, an audio processor 112, a wake-up (WU) determiner 114 for each agent, a display controller 116, a voice controller 118, a determiner 120, a provider 122, and a controller 124. When the agent functional controllers are not distinguished, they are simply referred to as an agent functional controller 150. Illustration of three agent functional controllers 150 is merely an example in which they associated with the number of the agent servers 200 in FIG. 1 and the number of agent functional controllers 150 may be two, or four or more. The software arrangement in FIG. 2 is shown in a simplified manner for description and can be arbitrarily modified, for example, such that the manager 110 may be interposed between the agent functional controller 150 and the on-board communication device 60 in practice.

Each component of the agent device 100 is realized, for example, by a hardware processor such as a central processing unit (CPU) executing a program (software). Some or all of these components may be realized by hardware (a circuit including circuitry) such as a large scale integration (LSI) circuit, an application specific integrated circuit (ASIC), a field-programmable gate array (FPGA) or a graphics processing unit (GPU) or realized by software and hardware in cooperation. The program may be stored in advance in a storage device (storage device including a non-transitory storage medium) such as a hard disk drive (HDD) or a flash memory or stored in a separable storage medium (non-transitory storage medium) such as a DVD or a CD-ROM and installed when the storage medium is inserted into a drive device.

The storage 160 stores, for example, voice recognition level information 162. The voice recognition level information 162 will be described in detail later.

The manager 110 functions according to execution of an operating system (OS) or a program such as middleware.

The audio processor 112 of the manager 110 performs audio processing on input sound such that the sound reaches a state in which it is suitable for recognizing a wake-up word preset for each agent.

The WU determiner 114 for each agent is present associated with each of the agent functional controllers 150-1, 150-2 and 150-3 and recognizes a wake-up word predetermined for each agent. The WU determiner 114 for each agent recognizes, from voice on which audio processing has been performed (voice stream), the meaning of the voice. First, the WU determiner 114 for each agent detects a voice section on the basis of amplitudes and zero crossing of voice waveforms in the voice stream. The WU determiner 114 for each agent may perform section detection based on voice recognition and non-voice recognition in units of frames based on a Gaussian mixture model (GMM).

Subsequently, the WU determiner 114 for each agent converts the voice in the detected voice section into text to obtain text information. Then, the WU determiner 114 for each agent determines whether the text information associates with a wake-up word. When it is determined that the text information associates with a wake-up word, the WU determiner 114 for each agent activates an associated agent functional controller 150. The function associated with the WU determiner 114 for each agent may be mounted in the agent server 200. In this case, the manager 110 transmits the voice stream on which audio processing has been performed by the audio processor 112 to the agent server 200, and when the agent server 200 determines that the voice stream has a wake-up word, the agent functional controller 150 is activated according to an instruction from the agent server 200. Each agent functional controller 150 may be constantly activated and perform determination of a wake-up word by itself. In this case, the manager 110 need not include the WU determiner 114 for each agent.

The determiner 120 determines whether a speed of the vehicle M is less than a first threshold value. The determiner 120 determines whether a voice recognition level derived by the audio processor 112 is equal to or greater than a predetermined threshold value or less than the predetermined threshold value. The provider 122 provides information for inducing an occupant to cause the window to be brought into a closed state or to be close to a closed state. When the agent functional controller 150 is activated, the controller 124 permits operation of a power window of the vehicle M when the speed of the vehicle M is less than the first threshold value and limits operation of the power window of the vehicle M when the speed of the vehicle M is equal to or greater than the first threshold value.

The agent functional controller 150 causes an agent to appear in cooperation with the agent server 200 associated thereto to provide a service including causing an output device to output a response of voice according to an utterance of the occupant of the vehicle M. The agent functional controllers 150 may include one authorized to control the vehicle device 50. The agent functional controllers 150 may include one that cooperates with the general-purpose communication device 70 via the pairing application executer 158 and communicates with the agent server 200. For example, the agent functional controller 150-1 is authorized to control the vehicle device 50. The agent functional controller 150-1 communicates with the agent server 200-1 via the on-board communication device 60. The agent functional controller 150-2 communicates with the agent server 200-2 via the on-board communication device 60. The agent functional controller 150-3 cooperates with the general-purpose communication device 70 via the pairing application executer 158 and communicates with the agent server 200-3.

The pairing application executer 158 performs pairing with the general-purpose communication device 70 according to Bluetooth (registered trademark), for example, and connects the agent functional controller 150-3 to the general-purpose communication device 70. The agent functional controller 150-3 may be connected to the general-purpose communication device 70 according to wired communication using a universal serial bus (USB) or the like. There are cases below in which an agent that is caused to appear by the agent functional controller 150-1 and the agent server 200-1 in cooperation is referred to as agent 1, an agent that is caused to appear by the agent functional controller 150-2 and the agent server 200-2 in cooperation is referred to as agent 2, and an agent that is caused to appear by the agent functional controller 150-3 and the agent server 200-3 in cooperation is referred to as agent 3.

The display controller 116 causes the first display 22 or the second display 24 to display an image according to an instruction from the agent functional controller 150. It is assumed that the first display 22 is used in the following description. The display controller 116 generates, for example, an image of a personified agent (hereinafter referred to as an agent image) that communicates with an occupant in the vehicle cabin and causes the first display 22 to display the generated agent image according to control of some agent functional controllers 150. The agent image is, for example, an image in the form of speaking to the occupant. The agent image may include, for example, a face image from which at least an observer (occupant) can recognize an expression or a face orientation. For example, the agent image may have parts imitating eyes and a nose at the center of the face region such that an expression or a face orientation is recognized on the basis of the positions of the parts at the center of the face region. The agent image may be three-dimensionally perceived such that the face orientation of the agent is recognized by the observer by including a head image in the three-dimensional space. The agent image may include an image of a main body (body, hands and legs) such that an action, a behavior, a posture, and the like of the agent can be recognized. The agent image may be an animation image.

The voice controller 118 causes some or all speakers included in the speaker 30 to output voice (speech) according to an instruction from the agent functional controller 150. The voice controller 118 may perform control of locating a sound image of an agent voice at a position associated with a display position of an agent image using a plurality of speaker 30. The position associated with the display position of the agent image is, for example, a position predicted to be perceived by the occupant as a position at which the agent image is talking in the agent voice, and specifically, is a position near the display position of the agent image (for example, within 2 to 3 [cm]). "Locating a sound image" is, for example, to determine a spatial position of a sound source perceived by the occupant by controlling the magnitude of sound transmitted to the left and right ears of the occupant.

[Agent Server]

Figure 5:
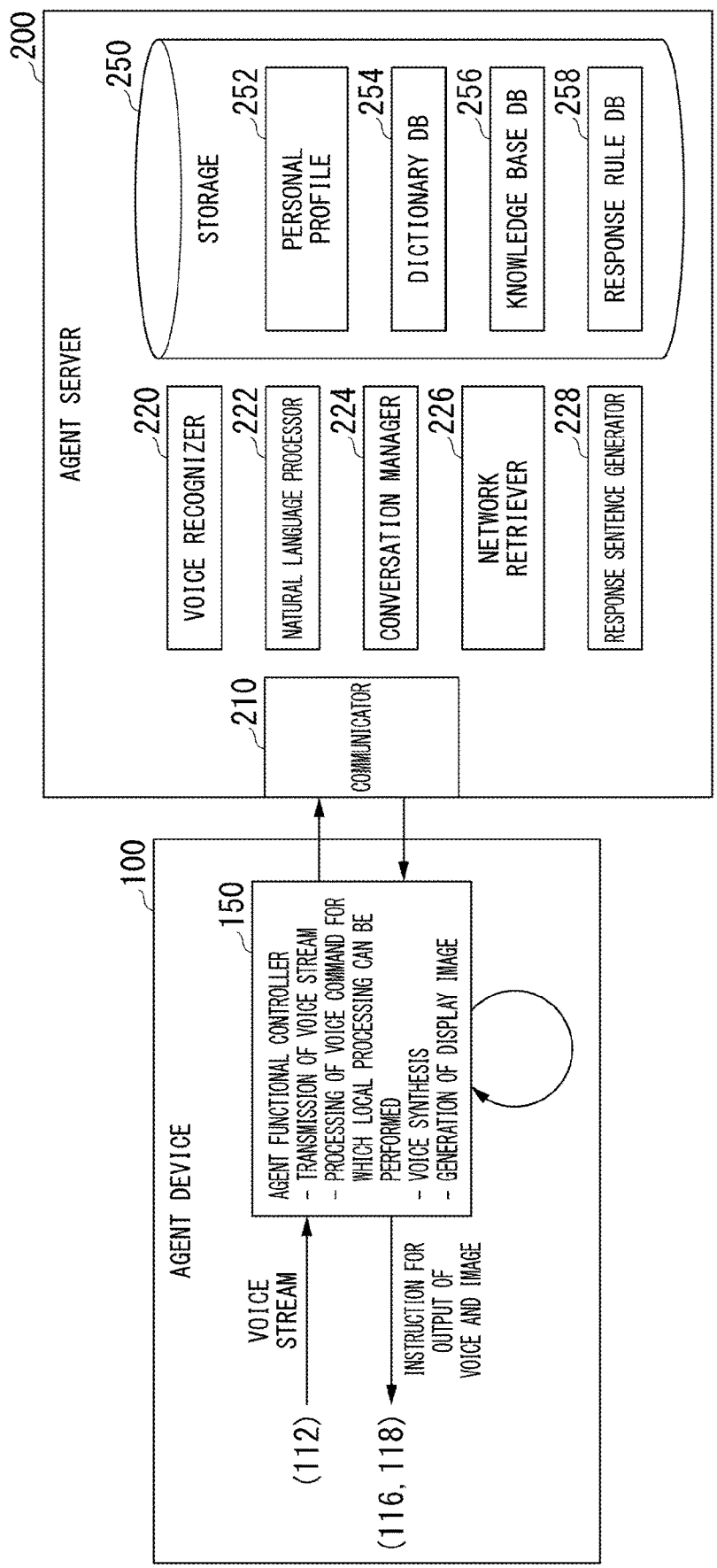
FIG. 5 is a diagram showing parts of a configuration of an agent server and the configuration of the agent device.

FIG. 5 is a diagram showing parts of the configuration of the agent server 200 and the configuration of the agent device 100. Hereinafter, the configuration of the agent server 200 and operations of the agent functional controller 150, and the like will be described. Here, description of physical communication from the agent device 100 to the network NW will be omitted.

The agent server 200 includes a communicator 210. The communicator 210 is, for example, a network interface such as a network interface card (NIC). Further, the agent server 200 includes, for example, a voice recognizer 220, a natural language processor 222, a conversation manager 224, a network retriever 226, and a response sentence generator 228. These components are realized, for example, by a hardware processor such as a CPU executing a program (software). Some or all of these components may be realized by hardware (a circuit including circuitry) such as an LSI circuit, an ASIC, an FPGA or a GPU or realized by software and hardware in cooperation.

The program may be stored in advance in a storage device (a storage device including a non-transitory storage medium) such as an HDD or a flash memory or stored in a separable storage medium (a non-transitory storage medium) such as a DVD or a CD-ROM and installed when the storage medium is inserted into a drive device.

The agent server 200 includes a storage 250. The storage 250 is realized by the above-described various storage devices. For example, data such as a personal profile 252, a dictionary database (DB) 254, a knowledge base DB 256, and a response rule DB 258 and programs are stored in the storage 250.

In the agent device 100, the agent functional controller 150 transmits a voice stream or a voice stream on which processing such as compression or encoding has been performed to the agent server 200. When a voice command which can cause local processing (processing performed without the agent server 200-1) to be performed is recognized, the agent functional controller 150 may perform processing requested through the voice command. The voice command which can cause local processing to be performed is a voice command to which a reply can be given by referring to a storage (not shown) included in the agent device 100 or a voice command for controlling the vehicle device 50 (for example, a command for turning on the air-conditioning device, or the like) in the case of the agent functional controller 150-1. Accordingly, the agent functional controller 150 may include some functions included in the agent server 200.

When the agent device 100 acquires the voice stream, the voice recognizer 220 performs voice recognition and outputs text information and the natural language processor 222 performs semantic interpretation on the text information with reference to the dictionary DB 254. The dictionary DB 254 is a DB in which abstracted semantic information is associated with text information. The dictionary DB 254 may include information about lists of synonyms. Steps of processing of the voice recognizer 220 and steps of processing of the natural language processor 222 are not clearly separated from each other and may affect each other in such a manner that the voice recognizer 220 receives a processing result of the natural language processor 222 and corrects a recognition result.

When a meaning such as "Today's weather" or "How is the weather today?" is recognized as a recognition result, for example, the natural language processor 222 generates a command replacing standard text information of "Today's weather". Accordingly, even when request voice includes variations in text, it is possible to easily make a conversation suitable for the request. The natural language processor 222 may recognize the meaning of text information using artificial intelligence processing such as machine learning processing using probabilities and generate a command based on a recognition result, for example.

The conversation manager 224 determines details of an utterance for the occupant of the vehicle M with reference to the personal profile 252, the knowledge base DB 256 and the response rule DB 258 on the basis of a processing result (command) of the natural language processor 222. The personal profile 252 includes personal information, preferences, past conversation histories, and the like of occupants stored for each occupant. The knowledge base DB 256 is information defining relationships between objects. The response rule DB 258 is information defining operations (replies, details of device control, or the like) that need to be performed by agents for commands.

The conversation manager 224 may identify an occupant by collating the personal profile 252 with feature information acquired from a voice stream. In this case, personal information is associated with the voice feature information in the personal profile 252, for example. The voice feature information is, for example, information about features of a talking manner such as a voice pitch, intonation and rhythm (tone pattern), and feature quantities according to mel frequency cepstrum coefficients and the like. The voice feature information is, for example, information obtained by causing the occupant to utter a predetermined word, sentence, or the like when the occupant is initially registered and recognizing the voice.

The conversation manager 224 causes the network retriever 226 to perform retrieval when the command is for requesting information that can be retrieved through the network NW. The network retriever 226 access the various web servers 300 via the network NW and acquires desired information. "Information that can be retrieved through the network NW" may be evaluation results of general users of a restaurant near the vehicle M or a weather forecast associated with the position of the vehicle M on that day, for example.

The response sentence generator 228 generates a response sentence and transmits the generated response sentence to the agent device 100 such that details of the utterance determined by the conversation manager 224 are delivered to the occupant of the vehicle M. When the occupant is identified as an occupant registered in the personal profile, the response sentence generator 228 may generate a response sentence for calling the name of the occupant in a speaking manner similar to the speaking manner of the occupant.

When the agent functional controller 150 acquires the response sentence, the agent functional controller 150 instructs the voice controller 118 to perform voice synthesis and output voice. The agent functional controller 150 instructs the display controller 116 to display an agent image suited to voice output. In this manner, an agent function in which an agent that has virtually appeared replies to the occupant of the vehicle M is realized.

[Power Window Control (1)]

When the agent functional controller 150 is activated, the controller 124 permits operation of a power window of the vehicle M when the speed of the vehicle M is less than the first threshold value and limits operation of the power window of the vehicle M when the speed of the vehicle M is equal to or greater than the first threshold value. There are cases below in which this control is referred to as "specific control."

A vehicle speed less than the first threshold value is zero or a speed at which the vehicle M travels slowly. A speed at which the vehicle M travels slowly is a speed at which the vehicle M can quickly stop and, for example, a speed exceeding zero and equal to or less than 10 km/hour. A speed equal to or greater than the first threshold value is a speed in a state in which the vehicle M is traveling. Limiting includes prohibiting operation and reducing a degree of operation.

When the speed of the vehicle M is less than the first threshold value and the occupant instructs the power window to be operated, the controller 124 operates the power window according to the instruction. When the speed of the vehicle M is less than the first threshold value, the power window performs an opening operation or a closing operation according to the aforementioned instruction. "Instruction" may be an instruction using an utterance or may be an instruction according to an operation performed on an operating switch that operates the power window. The opening operation is an operation of opening a window of the power window. The closing operation is an operation of closing a window of the power window.

When the speed of the vehicle M is equal to or greater than the first threshold value and the occupant instructs the power window to be operated, the controller 124 does not operate the power window according to the instruction. In this case, the instruction for operating the power window is an instruction for opening a window of the power window or an instruction for causing it to be close to a fully open state.

[Flowchart (1)]

Figure 6:
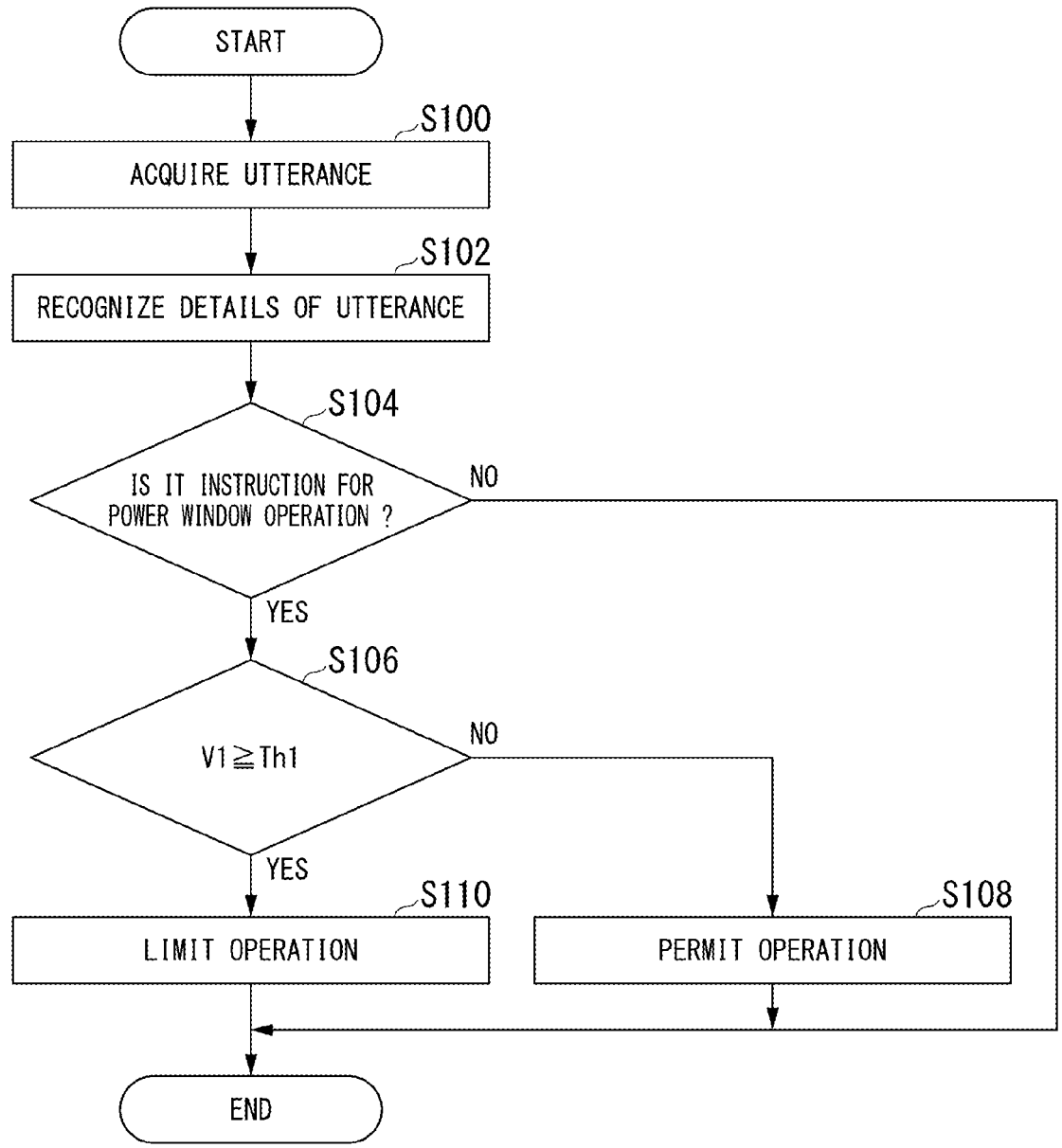
FIG. 6 is a flowchart showing an example of a processing flow executed by the agent device.

FIG. 6 is a flowchart showing an example of a processing flow executed by the agent device 100. This processing is processing executed when a window of the power window is in a closed state or in a closed state of equal to or greater than a first degree.

First, the acquirer 113 acquires an utterance of an occupant (step S100). Then, the determiner 120 recognizes details of the utterance acquired by the acquirer 113 in cooperation with the agent server 200 (step S102). Subsequently, the determiner 120 determines whether there is an instruction for power window operation (an instruction for opening a window) on the basis of the recognition result of step S102 (step S104). When it is determined that there is no instruction for power window operation, processing of this flowchart ends.

When it is determined that there is an instruction for a power window operation, the determiner 120 determines whether a vehicle speed V1 acquired by the vehicle speed sensor is equal to or greater than a threshold value Th1 (first threshold value) (step S106). When the vehicle speed V1 is not equal to or greater than the threshold value Th1 (less than the threshold value), the controller 124 permits a power window operation (step S108). When the vehicle speed V1 is equal to or greater than the threshold value Th1, the controller 124 limits the power window operation (step S110).

"Limiting an operation" is not to perform an instructed operation or to curb an operation greater than an instructed operation. "Not to perform an instructed operation" is "not to perform a window opening operation", for example. "To curb an operation greater than an instructed operation" is to open an indicated window to a second opening degree of the window instead of a first opening degree. The second opening degree is less than the first opening degree.

FIG. 7 is a diagram showing an example of a state in which a window is controlled according to an instruction of an occupant. For example, it is assumed that the window is instructed to be opened in a state in which the window of the vehicle M is fully closed ((1) of FIG. 7). For example, when the speed of the vehicle M is equal to or greater than a threshold value Th, the provider 122 provides information representing that the window cannot be opened to a user. For example, the agent functional controller 150 provides information such as "Window will be maintained in this state because service provision of the agent may be affected" to the user on the basis of an instruction of the provider 122 ((2) of FIG. 7). For example, when the speed of the vehicle M is less than the threshold value Th, the controller 124 controls the window such that it is opened ((3) of FIG. 7)).

For example, a case in which power window operation is not limited may be conceived. For example, when an occupant inputs an utterance to the agent device 100 in a state in which a window of a power window is open, noise such as wind noise and road noise may be input to the agent device 100. Then, quality of a service provided by the agent device 100 may deteriorate. For example, there are cases in which the agent device 100 cannot detect input voice with high accuracy and thus the accuracy of response information also deteriorates.

In contrast, the controller 124 of the present embodiment can provide a faithful service to the user by permitting an operation of the power window of the vehicle M when the speed of the vehicle M is less than the first threshold value and limiting the operation of the power window of the vehicle M when the speed of the vehicle M is equal to or greater than the first threshold value. For example, the agent device 100 can detect input voice with high accuracy and additionally provide response information more useful for the user or response information desired by the user to the user by limiting the operation of the power window of the vehicle M.

Modified Example of Flowchart

Figure 8:
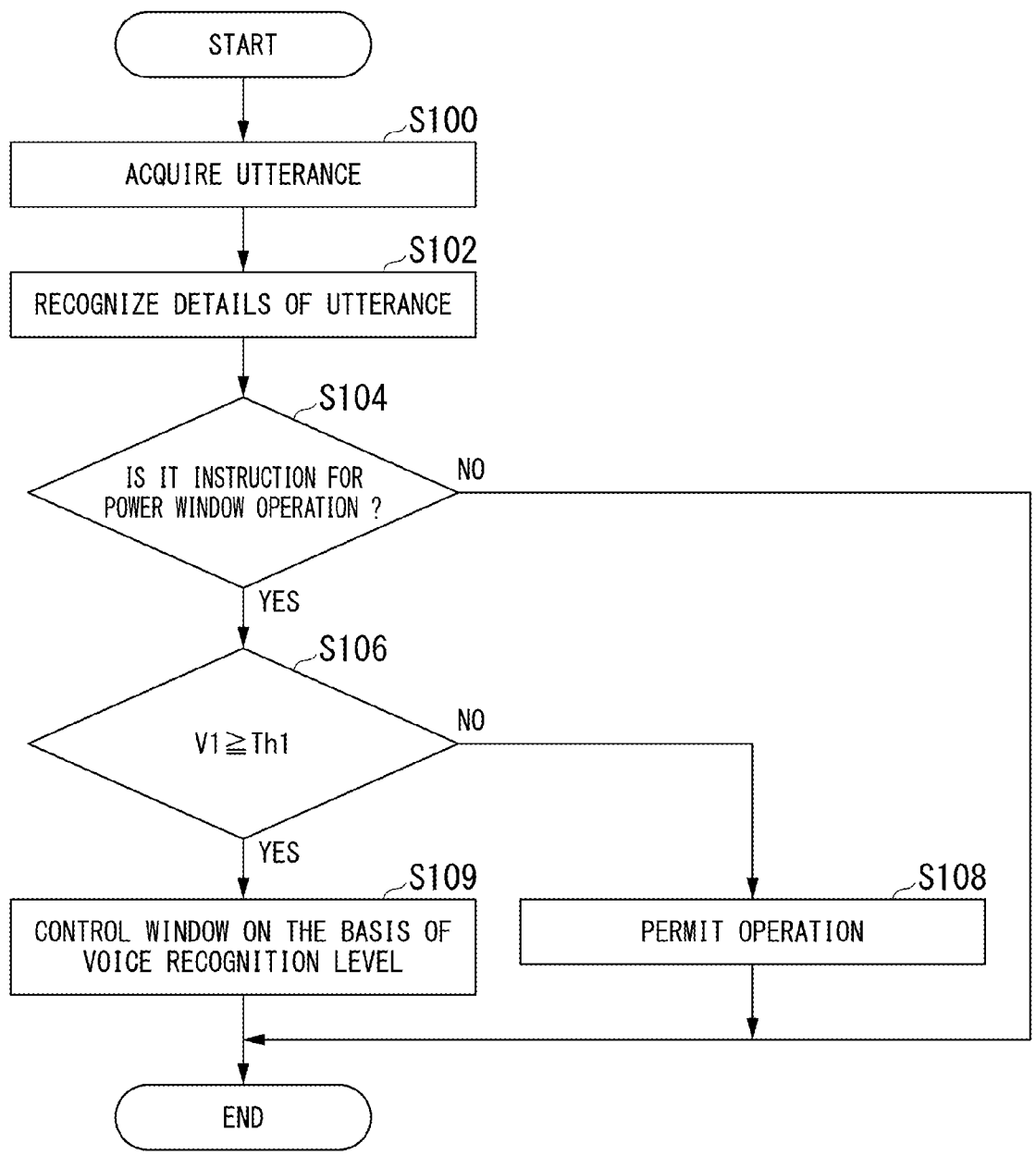
FIG. 8 is a flowchart showing an example of a processing flow of a modified example of the flowchart of FIG. 6.

FIG. 8 is a flowchart showing an example of a processing flow of a modified example of the flowchart of FIG. 6. In the flowchart of FIG. 8, a process of step S109 instead of the process of step S110 is performed. The process of step S109 will be described.

When the speed of the vehicle M is equal to or greater than the threshold value Th, the controller 124 controls the window on the basis of a voice recognition level (step S109). Controlling the window on the basis of a voice recognition level is to control an open state of the window by the controller 124 to a degree to which the agent device 100 can understand details of the utterance of the user. In other words, the window is controlled such that noise (signal of utterance, a voice recognition level) input to the microphone 10 in a state in which the window is open does not become less than a predetermined value.

Figure 9:
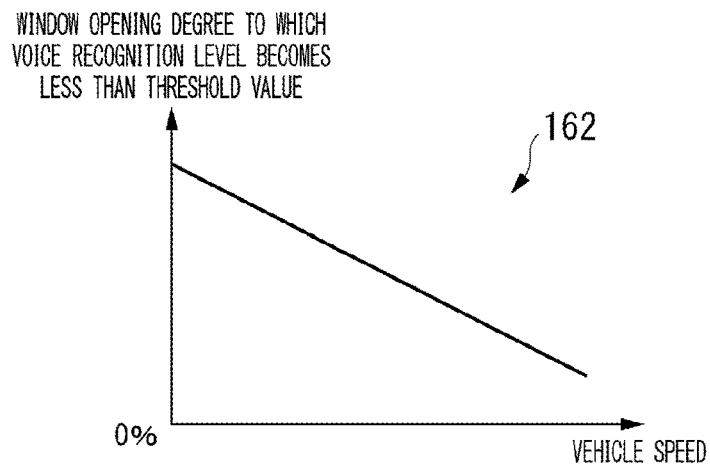
FIG. 9 is a diagram showing an example of details of voice recognition level information.

When the speed of the vehicle M is equal to or greater than the threshold value Th, the controller 124 controls the window with reference to the voice recognition level information 162. FIG. 9 is a diagram showing an example of details of the voice recognition level information 162. The voice recognition level information 162 is information generated by the base information 164 and the base information 166 shown in FIG. 10 which will be described later. The horizontal axis of the voice recognition level information 162 represents a vehicle speed and the vertical axis thereof represents a window opening degree (hereinafter, an opening degree) to which a voice recognition level is less than a threshold value. For example, the opening degree decreases as the vehicle speed increases. This is because wind noise, road noise, and the like are transmitted to the inside of the vehicle cabin to decrease a voice recognition level as the vehicle speed increases.

The audio processor 112 derives a voice recognition level on the basis of information included in voice input to the microphone 10. For example, the audio processor 112 estimates a signal that is noise on the basis of the input voice and derives a voice recognition level on the basis of the estimation result.

For example, the controller 124 acquires a route along which the vehicle M will travel in the future, determines a vehicle speed on the basis of the acquired route, and additionally acquires a window opening degree on the basis of the vehicle speed with reference to the voice recognition level information 162. For example, the controller 124 determines a legal speed limit of the acquired route or a maximum speed among legal speed limits of the acquired route as a vehicle speed used to determine the window opening degree. For example, when the vehicle M is traveling on a motorway at a legal speed limit of 80 km/hour for a predetermined time, 80 km/hour is determined as a vehicle speed used to determine the window opening degree.

Then, the controller 124 controls the window on the basis of the acquired window opening degree and an opening operation instruction of the user. That is, the window is opened to a degree to which the voice recognition level does not become less than the predetermined value. Accordingly, the controller 124 can respond to a request of the user while maintaining the quality of service provision. The process of acquiring a voice recognition level may be performed by a functional unit different from the audio processor.

Figure 10:
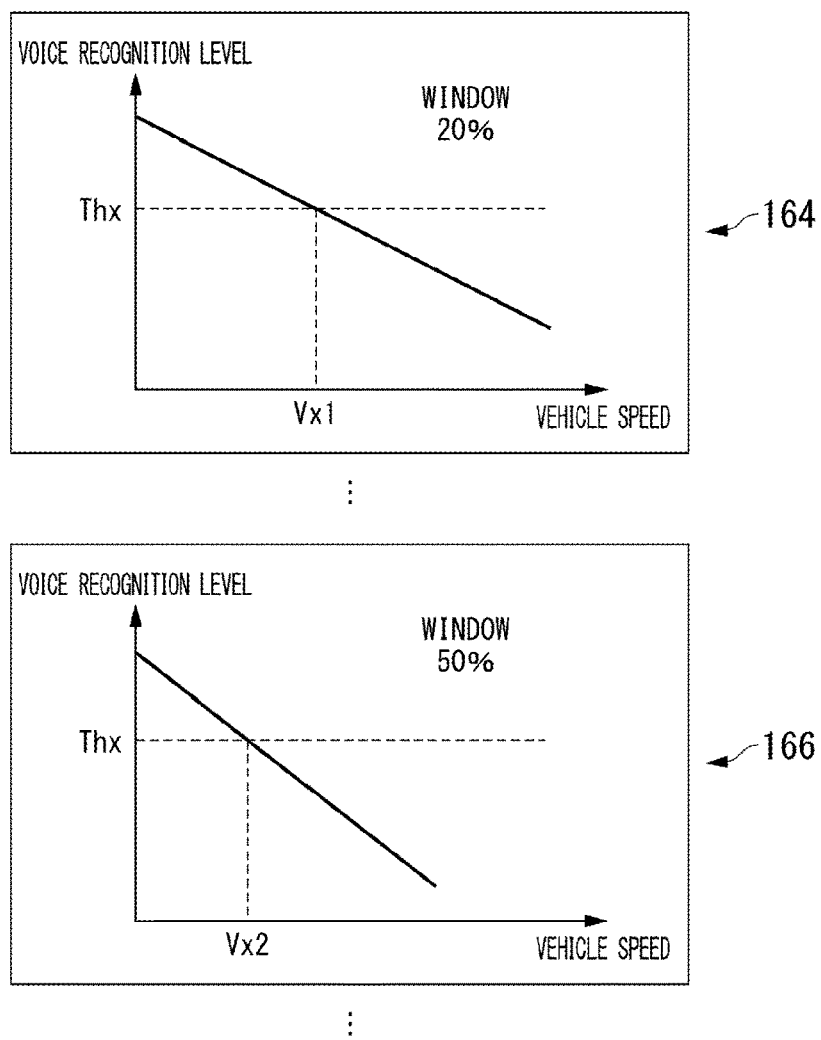
FIG. 10 is a diagram showing an example of base information and details of the base information.

FIG. 10 is a diagram showing an example of details of the base information 164 and the base information 166. For example, a vehicle speed at which a voice recognition level becomes less than a threshold value Thx is a vehicle speed Vx1 in a state in which a window is open about 20 percent, as shown in the base information 164. For example, the vehicle speed at which a voice recognition level becomes less than the threshold value Thx is a vehicle speed Vx2 in a state in which the window is open about 50 percent, as shown in the base information 166. The vehicle speed Vx2 is less than the vehicle speed Vx1. That is, the vehicle speed at which a voice recognition level becomes less than the threshold value Thx decreases as the window opening degree increases.

Figure 11:
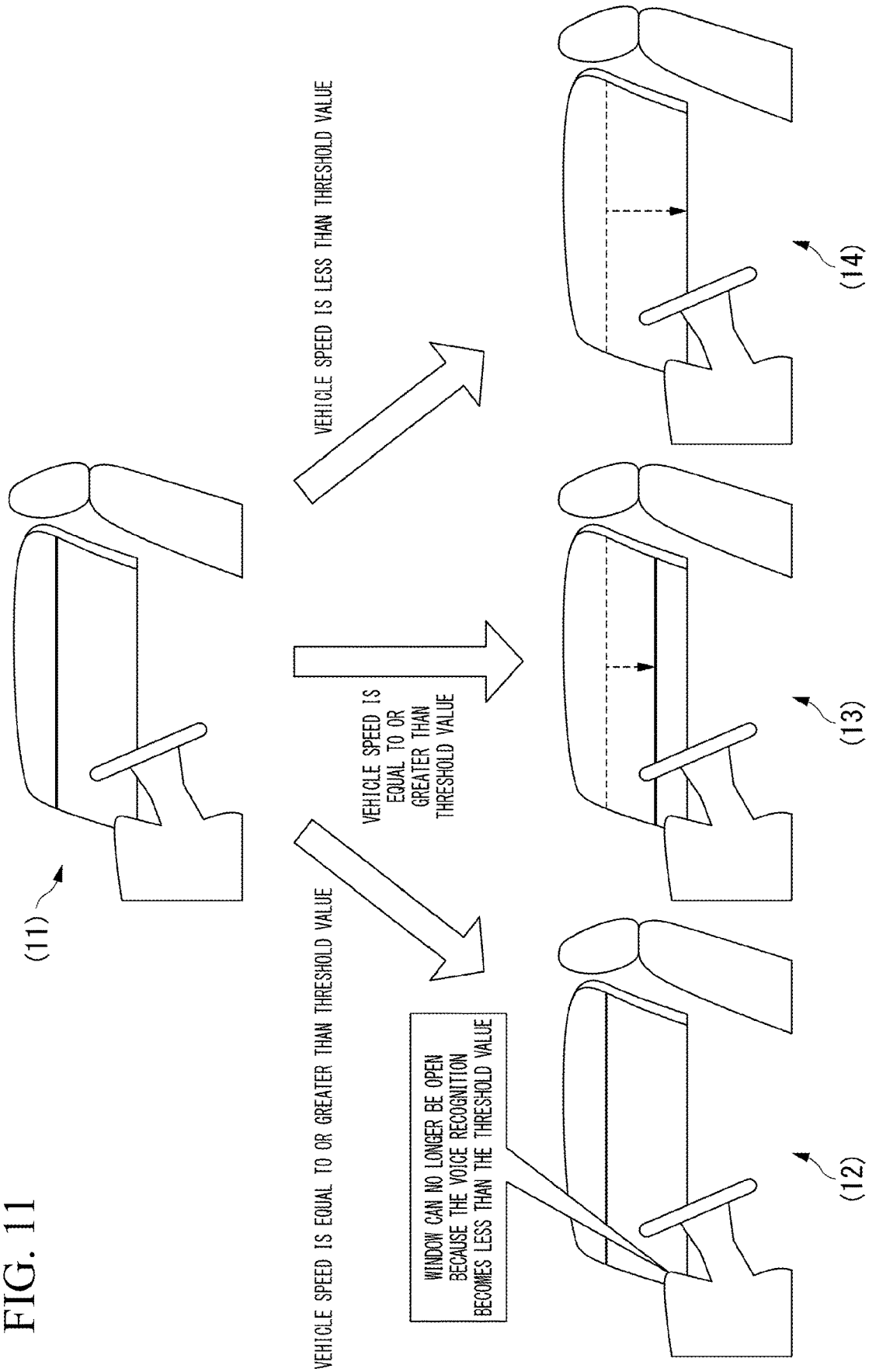
FIG. 11 is a diagram showing an example of a state in which a window is controlled according to an instruction of an occupant.

FIG. 11 is a diagram showing an example of a state in which a window is controlled according to an instruction of an occupant. For example, it is assumed that a window opening operation instruction is performed when the window is closed to the first degree or more ((11) of FIG. 11). For example, when the speed of the vehicle M is equal to or greater than the threshold value Th and the window has an opening degree associated with a voice recognition level, the provider 122 provides information representing that the window cannot be opened to the user ((12) of FIG. 11). For example, the agent functional controller 150 provides information such as "Window can no longer be opened because the voice recognition becomes less than the threshold value" to the user on the basis of an instruction of the provider 122.

For example, when the speed of the vehicle M is equal to or greater than the threshold value Th and the window is open to a degree less than an opening degree associated with a voice recognition level, the controller 124 controls the window such that it is open to the opening degree associated with the voice recognition level ((13) of FIG. 11). When the speed of the vehicle M is equal to or greater than the first threshold value and the occupant makes an utterance including an instruction for causing a window of the power window to be opened or an instruction for causing the window to be close to the fully open state, the controller 124 operates the window of the power window according to the instruction such that a recognition level at which the audio processor 112 recognizes the utterance does not become less than a predetermined value.

For example, when the speed of the vehicle M is less than the threshold value Th, the controller 124 controls the window such that it is opened ((14) of FIG. 11).

As described above, the agent device 100 can provide a more faithful service to the user while realizing a desire of the user by operating the window of the power window according to an instruction such that a recognition level does not become the predetermined value even when the vehicle speed is equal to or greater than the first threshold value.

In the above-described example, processing performed when the window is closed or closed to the first degree or more has been described. When the window is open or open to the first degree or more, processing described below may be performed.

A state in which a window is open to the first degree or more is a state in which the window is open more than the window closed to the first degree or more. For example, when the user makes an utterance including an instruction for causing a window of the power window to be closed or an instruction for causing the window to be close to a fully closed state in a state in which the window of the power window is open and the speed of the vehicle M is equal to or greater than the first threshold value, the controller 124 operates the power window according to the instruction without limiting the operation of the power window.

For example, when the user makes an utterance including an instruction for causing a window of the power window to be closed or an instruction for causing the window to be close to a fully closed state in a case in which windows are open in a state in which the window of the power window is open, the speed of the vehicle M is equal to or greater than the first threshold value, and a voice recognition level is less than the predetermined value, the controller 124 may operate the power window according to the instruction without limiting the operation of the power window.

Figure 12:
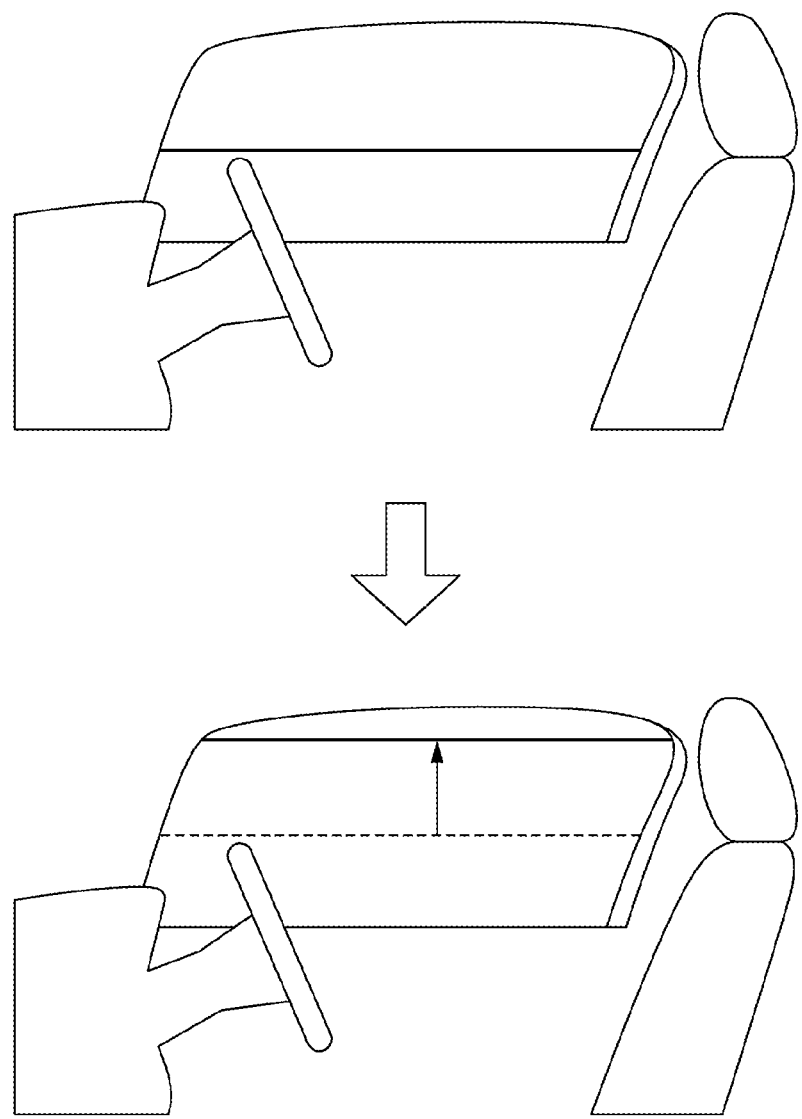
FIG. 12 is a diagram showing an example of a state in which a window is controlled such that it switches from an open state to a closed state.

FIG. 12 is a diagram showing an example of a state in which a window is controlled such that it switches from an open state to a closed state. For example, when the user makes an utterance including an instruction for causing a window of the power window to be close to the fully closed state, the controller 124 operates the window of the power window such that it is close to the fully closed state as shown in FIG. 12.

[Control with Respect to Notification]

When the acquirer 113 acquires an utterance of the occupant in a state in which a window of the power window is open and the speed of the vehicle M is equal to or greater than a second threshold value, the provider 122 provides information for inducing the occupant to cause the window to be closed or to be close to a closed state.

[Flowchart (2)]

Figure 13:
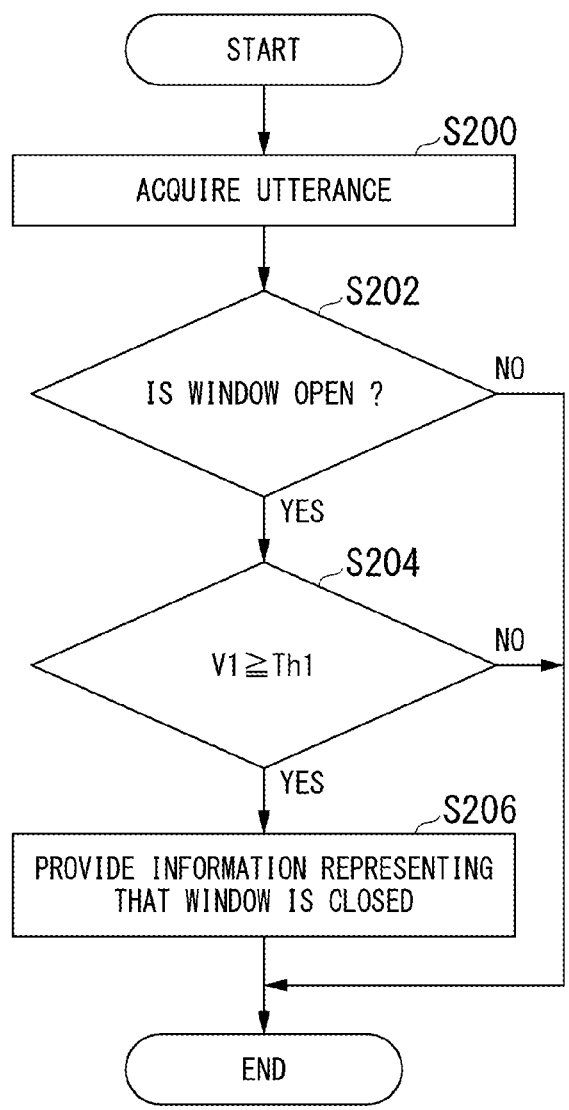
FIG. 13 is a flowchart showing an example of a processing flow executed by the agent device.

FIG. 13 is a flowchart showing an example of a processing flow executed by the agent device 100. First, the acquirer 113 acquires an utterance of a user (step S200). Then, the determiner 120 determines whether a window of the power window is open (step S202). The determiner 120 may determine whether the window is open to a predetermined degree or more. The predetermined degree is a degree of an open state which is estimated to affect service provision of the controller 124. For example, the predetermined degree is a degree estimated to be a degree to which noise of a predetermined value or more inputs to the microphone 10. When it is determined that the window is not open, processing of this flowchart ends.

When it is determined that the window is open, the determiner 120 determines whether the speed V1 of the vehicle M is equal to or greater than the threshold value Th1 (step S204). When the speed V1 of the vehicle M is not equal to or greater than the threshold value Th1 (when the speed V1 of the vehicle M is less than the threshold value Th1), processing of this flowchart ends. When the speed V1 of the vehicle M is equal to or greater than the threshold value Th1, the provider 122 provides information representing that the window is closed to the user (step S206). Accordingly, processing of this flowchart ends.

As described above, when an utterance of the occupant is acquired in a state in which the window of the power window is open and the speed of the vehicle M is equal to or greater than the second threshold value, the provider 122 provides information for inducing the occupant to cause the window to be closed or to be close to a closed state to the occupant, and thus it is possible to induce the user to perform assistance for providing a more faithful service to the user.

[Control of Power Window (2)]

When a window of the power window is open, the speed of the vehicle M is equal to or greater than the first threshold value, and a recognition level at which the audio processor 112 recognizes an utterance is less than a predetermined value, the controller 124 controls the power window to be closed such that the recognition level becomes the predetermined value or more.

[Control of Power Window (3)]

Figure 14:
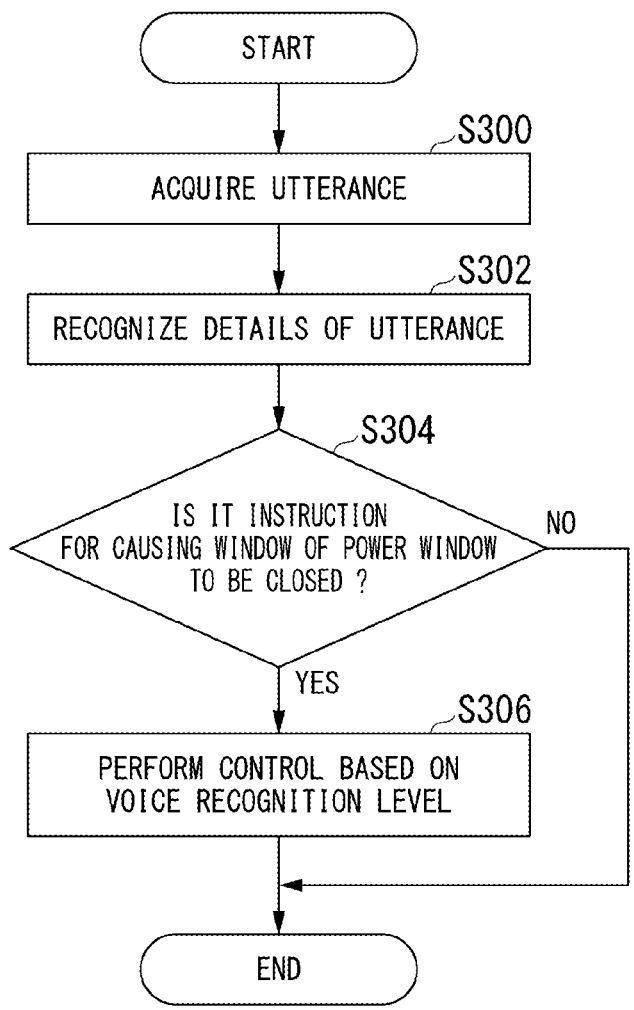
FIG. 14 is a flowchart showing an example of a processing flow executed by the agent device.

FIG. 14 is a flowchart showing an example of a processing flow executed by the agent device 100. First, the acquirer 113 acquires an utterance of a user (step S300). Then, the determiner 120 recognizes details of the utterance acquired by the acquirer 113 in cooperation with the agent server 200 (step S302). Then, the determiner 120 determine whether there is an instruction for causing a window of the power window to be closed on the basis of the recognition result of step S302 (step S304). When it is determined that there is no instruction for causing the window of the power window to be closed, processing of this flowchart ends.

When it is determined that there is an instruction for causing the window of the power window to be closed, the controller 124 controls the window to a position at which the recognition level becomes the predetermined value or more (step S306). In other words, the controller 124 controls the window to a position at which the recognition level does not become less than the predetermined value with reference to the voice recognition level information 162. Accordingly, processing of this flowchart ends.

According to the above-described processing, the agent device 100 can respond to a request of a user while maintaining the quality of service provision by controlling the window to a position at which the recognition level does not become less than the predetermined value.

Although a window is instructed to be opened or closed according to an utterance in the above-described processing, the aforementioned processing may be performed on the basis of an operation other than an utterance instead of (in addition to) the utterance. Processing other than an utterance is, for example, an operation performed on a button for operating the power window. In this case, the controller 124 detects that an operation has been performed on the button for operating the power window and performs processing of limiting the operation of the power window on the basis of the detection result.

A window that is a control target or a determination target in processing such as limiting the operation of the power window may be a predetermined window. The predetermined window may be a closest window at the seat on which the occupant sets or may be a predetermined window.

If the speed of the vehicle M is equal to or greater than the first threshold value when the agent functional controller 150-1 (only the agent functional controller 150-1) is activated, the controller 124 may execute processing of limiting the operation of the power window of the vehicle M or perform specific control when another agent functional controller 150 is activated.

The above-described processing may also be applied to opening/closing of a convertible roof or a sunroof. In this case, the agent device 100 may permit the operation of the convertible roof or the sunroof of the vehicle M when the speed of the vehicle M is less than the first threshold value and limit the operation of the convertible roof or the sunroof of the vehicle M when the speed of the vehicle M is equal to or greater than the first threshold value.

According to the above-described first embodiment, the controller 124 can provide more faithful services to a user by permitting the operation of the power window of the vehicle M when the speed of the vehicle M is less than the first threshold value and limiting the operation of the power window of the vehicle M when the speed of the vehicle M is equal to or greater than the first threshold value.

Second Embodiment

Hereinafter, a second embodiment will be described. In the second embodiment, the agent functional controller 150 executes specific control. Hereinafter, differences from the first embodiment will be described.

Figure 15:
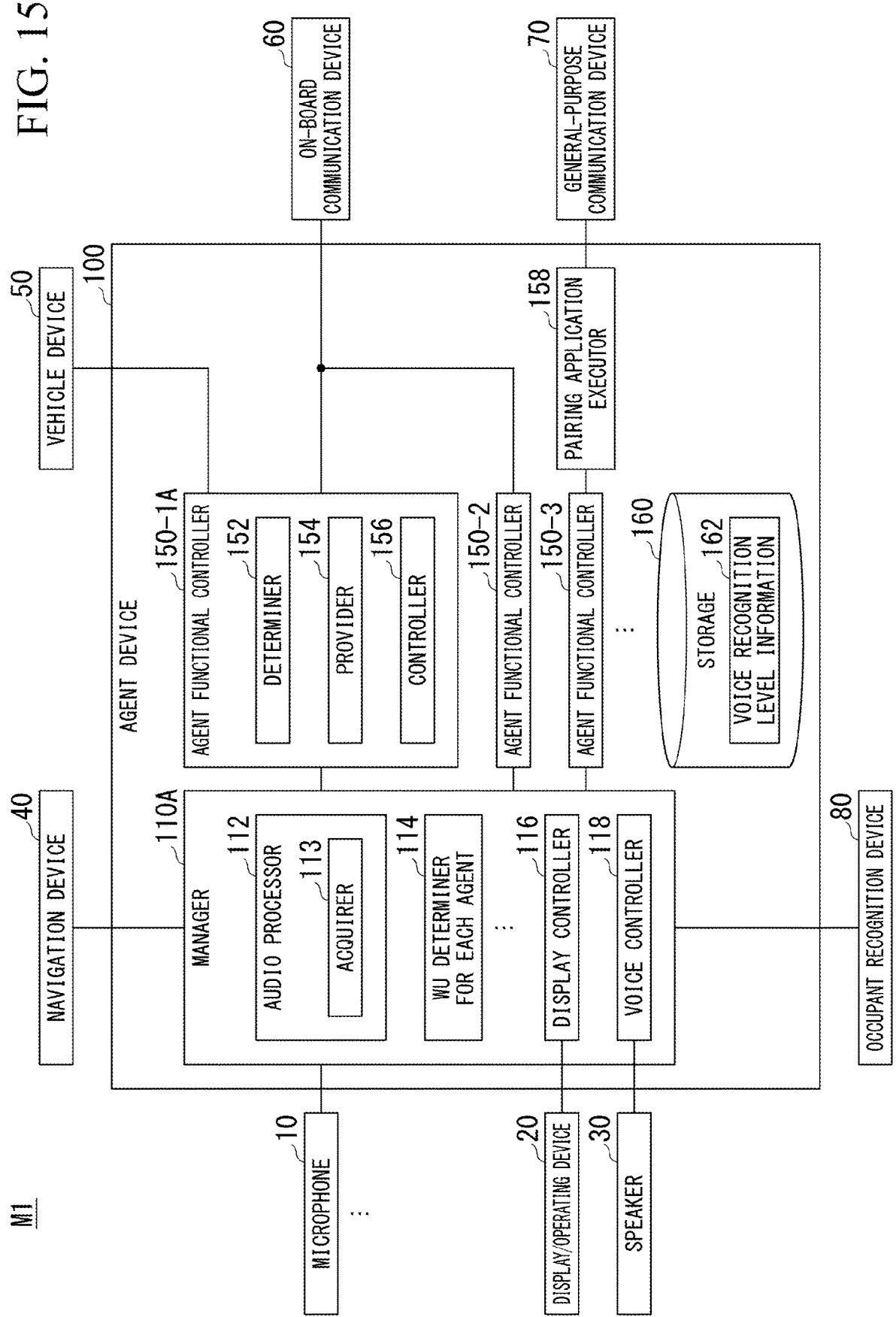
FIG. 15 is a configuration diagram of an agent system 1 including an agent device of a second embodiment.

FIG. 15 is a functional diagram of an agent system 1 including an agent device 100 of the second embodiment. A vehicle M1 of the second embodiment includes a manager 110A instead of the manager 110 and an agent functional controller 150-1A instead of the agent functional controller 150-1. In the manager 110A, the determiner 120, the provider 122, and the controller 124 are omitted. The agent functional controller 150-1A includes, for example, a determiner 152, a provider 154, and a controller 156. The determiner 152, the provider 154, and the controller 156 respectively include the same functions as those of the determiner 120, the provider 122, and the controller 124. The controller 156 executes specific control on the basis of a determination result of the determiner 152 when the agent functional controller 150-1A is activated.

When an agent functional controller 150 different from the agent functional controller 150-1A is activated, the agent functional controller 150-1A may be activated and the controller 156 may execute the specific function.

According to the above-described second embodiment, the agent functional controller 150-1A executes the specific control to obtain the same effects as those obtained in the first embodiment.

While forms for carrying out the present invention have been described using the embodiments, the present invention is not limited to these embodiments at all, and various modifications and substitutions can be made without departing from the gist of the present invention.

What is claimed is:

1. An agent device comprising:
an agent functional controller configured to provide a service including causing an output device to output a voice response in response to an utterance of an occupant of a vehicle; and
a controller configured to:
permit an operation of a power window of the vehicle in response to determining that a speed of the vehicle is less than a threshold value and limit the operation of the power window of the vehicle in response to determining that the speed of the vehicle is equal to or greater than the first threshold value while the agent functional controller is activated, and
in response to determining that a recognition level at which a voice recognizer, which is configured to recognize details of utterances of the occupant, recognizes the utterance is less than a predetermined value in a state in which the power window is open and the speed of the vehicle is equal to or greater than the threshold value, initiate an instruction to close the power window such that the recognition level becomes equal to or greater than the predetermined value.

2. The agent device according to claim 1, wherein the instruction is a first instruction, and
the controller is further configured to, in response to determining that the speed of the vehicle is less than the threshold value and the occupant inputs a second instruction to operate the power window, operate the power window according to the second instruction.

3. The agent device according to claim 2, wherein the second instruction to operate the power window is input via an utterance or via an operation of an operating switch.

4. The agent device according to claim 1, wherein
the instruction is a first instruction, and
the controller is further configured to, in response to determining that the speed of the vehicle is equal to or greater than the threshold value and the occupant inputs a second instruction to operate the power window, prevent operation of the power window according to the second instruction.

5. The agent device according to claim 1, wherein the operation of the power window is an operation of opening the power window to a fully open state or close to the fully open state.

6. The agent device according to claim 1, wherein
the instruction is a first instruction, and
the controller is further configured to, in response to determining that the speed of the vehicle is equal to or greater than the threshold value and the occupant makes an utterance including a second instruction for causing the power window to be opened or for causing the power window to be close to a fully open state, operate the power window according to the second instruction such that the recognition level at which the voice recognizer recognizes the utterance does not become less than a predetermined value.

7. The agent device according to claim 1, wherein
the instruction is a first instruction, and
the controller is further configured to, in response to determining that the occupant makes an utterance including a second instruction for causing the power window to be closed or for causing the power window to be close to a fully closed state in a state in which the power window is open and the speed of the vehicle is equal to or greater than the threshold value, operate the power window according to the second instruction without limiting the operation of the power window.

8. The agent device according to claim 1,
the threshold value is a first threshold value, and
the agent device further comprises:
a provider configured to provide information for inducing the occupant to close the power window or cause the power window to be close to a closed state in response to determining that the occupant makes an utterance in a state in which the power window is open and the speed of the vehicle is equal to or greater than a second threshold value.

9. The agent device according to claim 1, wherein a vehicle speed less than the threshold value is zero or a vehicle speed at which the vehicle travels slowly.

10. The agent device according to claim 1, wherein the controller is configured to not limit the operation of the power window in a state in which the agent functional controller is not activated and another agent functional controller different from the agent functional controller is activated.

11. An agent device control method comprising:
providing, by an agent functional controller comprising a processor, a service including causing an output device to output a voice response in response to an utterance of an occupant of a vehicle to provide the service;
permitting, by a controller, an operation of a power window of the vehicle in response to determining that a speed of the vehicle is less than a threshold value and limiting the operation of the power window in response to determining that the speed of the vehicle is equal to or greater than the threshold value while the agent functional controller is activated; and in response to determining that a recognition level at which a voice recognizer, which is configured to recognize details of utterances of the occupant, recognizes the utterance is less than a predetermined value in a state in which the power window is open and the speed of the vehicle is equal to or greater than the threshold value, initiate, by the controller, an instruction to close the power window such that the recognition level becomes equal to or greater than the predetermined value.

12. A non-transitory computer-readable storage medium that stores a computer program that, in response to execution by a computer, causes the computer to perform operations, comprising:

causing an agent functional controller configured to provide a service including causing an output device to output a voice response to an utterance of an occupant of a vehicle to provide the service;

permitting an operation of a power window of the vehicle in response to determining that a speed of the vehicle is less than a threshold value and limiting the operation of the power window in response to determining that the speed of the vehicle is equal to or greater than the threshold value while the agent functional controller is activated; and in response to determining that a recognition level at which a voice recognizer, which is configured to recognize details of utterances of the occupant, recognizes the utterance is less than a predetermined value in a state in which the power window is open and the speed of the vehicle is equal to or greater than the threshold value, initiating an instruction to close the power window such that the recognition level becomes equal to or greater than the predetermined value.

* * * * *